United States Patent
Meredith et al.

(10) Patent No.: US 8,923,809 B2
(45) Date of Patent: Dec. 30, 2014

(54) DATA RATE THROTTLING

(71) Applicant: AT&T Mobility II LLC, Atlanta, GA (US)

(72) Inventors: Sheldon Kent Meredith, Marietta, GA (US); Mark Wade Pack, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/686,222

(22) Filed: Nov. 27, 2012

(65) Prior Publication Data

US 2014/0148122 A1    May 29, 2014

(51) Int. Cl.
    *H04M 11/00*      (2006.01)
    *H04M 3/00*      (2006.01)
    *H04W 24/00*      (2009.01)
    *H04L 12/26*      (2006.01)
    *H04W 28/02*      (2009.01)

(52) U.S. Cl.
    CPC ................................. *H04W 28/0226* (2013.01)
    USPC ........... 455/405; 455/418; 455/423; 370/232; 370/235; 370/253

(58) Field of Classification Search
    CPC ..... H04W 24/00; H04W 24/02; H04W 24/04; H04W 24/08; H04W 28/18; H04W 28/22; H04W 52/26; H04W 52/267; H04W 72/08; H04W 72/082; H04L 1/0002; H04L 47/00; H04L 47/10; H04L 47/25; H04B 17/00; H04B 17/0075

USPC ................. 455/405, 418–420, 423, 442–444, 455/450–453, 464; 370/230–235, 252, 437, 370/465; 375/225
See application file for complete search history.

(56) References Cited

U.S. PATENT DOCUMENTS

| | | | |
|---|---|---|---|
| 7,031,254 B2 | 4/2006 | Abraham et al. | |
| 7,483,711 B2 | 1/2009 | Burchfiel | |
| 7,873,074 B1 * | 1/2011 | Boland | 370/468 |
| 7,899,019 B1 | 3/2011 | Evans et al. | |
| 2003/0114169 A1 * | 6/2003 | Okamura et al. | 455/456 |
| 2003/0156580 A1 * | 8/2003 | Abraham et al. | 370/389 |
| 2004/0001461 A1 * | 1/2004 | Lohtia et al. | 370/331 |
| 2004/0095892 A1 * | 5/2004 | Sampath et al. | 370/252 |
| 2006/0105774 A1 * | 5/2006 | Ranta-Aho et al. | 455/453 |
| 2006/0120321 A1 * | 6/2006 | Gerkis et al. | 370/329 |
| 2007/0298726 A1 | 12/2007 | Fuqua | |
| 2008/0192773 A1 * | 8/2008 | Ou et al. | 370/468 |
| 2009/0129272 A1 | 5/2009 | Padfield et al. | |
| 2010/0046374 A1 * | 2/2010 | Ludwig et al. | 370/236 |
| 2011/0058478 A1 * | 3/2011 | Krym et al. | 370/237 |
| 2011/0319129 A1 | 12/2011 | Bhat et al. | |

(Continued)

*Primary Examiner* — Michael Mapa
(74) *Attorney, Agent, or Firm* — Amin, Turocy & Watson, LLP

(57) ABSTRACT

The throttling of mobile device data rates is provided at events, e.g., sporting events, and other venues with large, dense crowds. The system can monitor the loading of the mobile radio antennas at the venue, and when the loading reaches a threshold loading point, the system can selectively throttle the data rates of mobile devices at the venue. In some embodiments, the system can throttle the data rates of certain applications on the mobile devices, or can select mobile devices that are placing a large strain on the network infrastructure to throttle. In other embodiments, the system can set maximum upload and download speeds for all the mobile devices at the venue.

20 Claims, 8 Drawing Sheets

(56) References Cited

U.S. PATENT DOCUMENTS

2012/0173477 A1* 7/2012 Coutts et al. .................. 707/602
2013/0132559 A1* 5/2013 Kotecha et al. ................ 709/224
2013/0223222 A1* 8/2013 Kotecha et al. ................ 370/235

* cited by examiner

DATA RATE THROTTLING

TECHNICAL FIELD

The subject disclosure relates to wireless communications and more particularly to various embodiments that facilitate throttling the data rate of mobile devices at a major venue or sporting event.

BACKGROUND

Sporting events and other dense gatherings of thousands of people using mobile devices can stress and overwhelm mobile radio network infrastructure and cellular service. Both voice and data can become patchy and unusable. Efforts to maintain service by establishing temporary or portable mobile radio antennas can mitigate service overload conditions. However, even with these efforts, large crowds can still stress the infrastructure enough to cause noticeable gaps in service.

DETAILED DESCRIPTION

Figure 1:
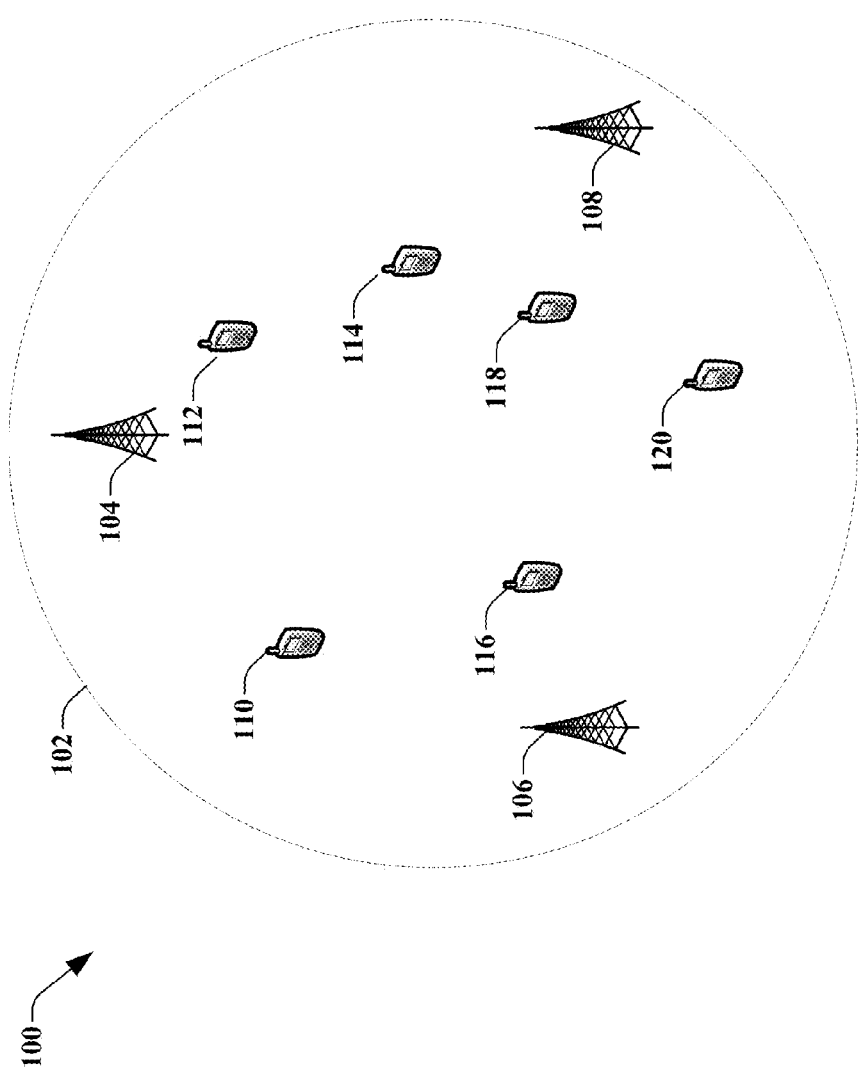
FIG. 1 is a block diagram illustrating an example, non-limiting embodiment of a system that identifies mobile devices in a location in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As mentioned, gaps in service can be caused by crowd behavior on a wireless communications network, for both data and voice. It is further noted that this can be exacerbated by the demographics of the given crowd and the context of a situation. For example, tickets to sporting events are expensive, and thus, the types of people that can afford these tickets are also more likely to own smartphones that tend to disproportionately stress the mobile radio antennas. Voice calling can take up more bandwidth than simple texting and network control communications, while video streaming and uploading of pictures and video can use an order of magnitude greater bandwidth than voice calling.

Additionally, sporting events and other public gatherings spur the use of these bandwidth heavy activities as people attempt to share notable events with their friends and family. These types of usage naturally lead to spikes in transmissions as homeruns, touchdowns, halftime activities, and other events encourage sharing of photos and videos. These spikes can be unplanned and sudden, and can stress the radio antennas such that disruptions become highly noticeable, even for voice callers.

Various embodiments described herein relate to a system that facilitates the throttling of mobile device data rates at sporting events, and other venues with large, dense crowds. The system can monitor the loading of the mobile radio antennas at the venue, and when the loading reaches a threshold loading point, the system can selectively throttle the data rates of mobile devices at the venue. In some embodiments, the system can throttle the data rates of certain applications on the mobile devices, or can select mobile devices that are placing a large strain on the network infrastructure to throttle. In other embodiments, the system can set maximum upload and download speeds for all the mobile devices at the venue.

In some embodiments, the mobile device data rate throttling system can identify mobile devices that are disproportionately placing loads on the mobile radio antennas. Mobile devices that are particularly close to the radio antennas can cause increased amounts of interference wherein the receiver captures a strong signal making it very difficult for the same receiver to detect a weaker signal. This interference is particularly bad in CDMA (Code Division Multiple Access) systems but can also be problematic in other systems. Mobile devices that are further away or are behind barriers and drawing more power than other mobile devices can also place additional loads on the available radio resources. Once these mobile devices are identified, the mobile device data rate throttling system can selectively throttle transmissions to and from these mobile devices in order to reduce the load on the mobile radio antennas.

In other embodiments, the system can track the loading of the radio antennas and employ the data rate throttling when the loading crosses, or is about to cross a threshold level. The threshold can be set such that the data rate throttling is activated before service disruptions manifest in the venue. Accordingly, the mobile device data rate throttling system can react very quickly to spikes in usage, and already have mobile devices selected for throttling before the decision to throttle is made. In some embodiments, the mobile device data rate throttling system can also predict when peaks in loading will occur based on current contextual information and past events. At sporting events for instance, peaks in usage can occur at the beginning and ending of the events, as well as during scheduled breaks such as halftimes, innings, etc. The system can employ data rate throttling just before a predicted peak in order to minimize potential disruptions in service.

In one or more embodiments, a system includes a memory that stores computer executable instructions and a processor that is communicatively coupled to the memory and the processor facilitates execution of the computer-executable instructions to perform operations. The operations can include identifying a set of mobile devices served by a set of radio antennas and determining that a first data rate of a radio antenna of the set of radio antennas is to be reduced to maintain a data rate level, wherein the data rate level is based on a function of a defined level. The operations can also include selecting a mobile device from the set of mobile devices to be subjected to data rate reduction and instructing that a second data rate of the mobile device is to be reduced.

In another embodiment, a method includes determining, by a system including a processor, identities of a set of mobile devices that are in a defined area. The method also includes monitoring, by the system, a first data rate of a radio antenna that communicates with the set of mobile devices in the defined area and determining, by the system, whether to adjust a second data rate of a mobile device based on whether the first data rate of the radio antenna satisfies a defined criterion. The method also includes selecting, by the system, the mobile device for which the second data rate is to be adjusted in response to a determination that the second data rate is to be adjusted.

In another embodiment, a computer readable storage device, comprising computer executable instructions that in response to execution cause a device including a processor to perform operations including monitoring a first data rate of a radio antenna. The operations also include determining to restrict a second data rate of an application on a mobile device in response to the first data rate of the radio antenna being determined to satisfy a defined level. The operations can also include instructing the mobile device to restrict the second data rate of the application based on an amount of data transferred over a defined time period by the application.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

Turning now to FIG. 1, illustrated is a block diagram of an example, non-limiting embodiment of a system 100 that identifies mobile devices in a location in accordance with various aspects described herein. System 100 includes a plurality of radio antennas 104, 106, and 108 in an area 102 that provide service for mobile devices 110, 112, 114, 116, 118, and 120. The mobile network infrastructure that radio antennas 104, 106, and 108 are a part of can learn the identities of the mobile devices that are present in the area 102.

The area 102 can be a location such as a concert venue, a sports stadium, political rally, or any other localized area where large numbers of people gather densely. In some embodiments, the area 102 can include a permanent structure such as a stadium with many radio antennas that are designed to service mobile devices in that location. In other embodiments, the area 102 can be temporary, and can include the area served by a selected set of radio antennas. For instance, when a large crowd gathers in a location that does not have regular gatherings, the nearby radio antennas that service that location can be designated as belonging to area 102.

In some embodiments, the radio antennas 104, 106, and 108 can be permanently installed radio antennas that are designed to service a stadium or other venue. One or more of the radio antennas can also be temporary antennas that are brought into the area 102 to help provide mobile voice and data service for the large crowds present. It is also to be appreciated that while FIG. 1 shows only three radio antennas, this is only an exemplary embodiment and in other embodiments, other numbers of radio antennas are possible.

The mobile devices can include cellphones, smartphones, pagers, tablets, laptops, and other devices that can send and/or receive voice or data services over a cellular network. It is noted that although various aspects and embodiments are discussed herein with respect to UMTS and/or LTE, the disclosed aspects are not limited to a UMTS implementation and/or an LTE implementation. For example, aspects or features of the disclosed embodiments can be exploited in substantially any wireless communication technology. Such wireless communication technologies can include UMTS, CDMA, Wi-Fi, Worldwide Interoperability for Microwave Access (WiMAX), General Packet Radio Service (GPRS), Enhanced GPRS, Third Generation Partnership Project (3GPP) LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

The mobile network system can identify the mobile devices that are present in area 102 based on transmissions between the mobile devices 110-120. Control messages can be sent between the mobile device and the network via the radio antennas even when the mobile devices are not actively making phone calls or using the data services. The mobile network system can identify the mobile devices that enter the area 102 based on identifiers transmitted in response to the control messages. The identifiers can include an IMSI (International Mobile Subscriber Identity) and/or a TMSI (Temporary Mobile Subscriber Identity) identifier. An HLR (Home Location Register), or a local VLR (Visitor Location Register) can store the details of every mobile device and/or subscriber that is authorized to use the network (HLR) or local MSC (Mobile Switching Center). The IMSI is a permanent identifier and the TMSI is a temporary identifier that can be randomly assigned by the VLR to every mobile in the area served by the MSC.

Accordingly, the mobile network system can learn the identities of all the mobile devices 110-120 that are in the area 102, even if the mobile devices 110-120 have not been used. Once the identities are discovered, information about the mobile subscriber and past usage of the mobile device can also be learned. This information can be used to build a user profile that shows application usage and data rate usage of the mobile device over time. The user profile can also be analyzed to indicate the probability of high data rate usage while in the area 102. For instance, a mobile subscriber that has in the past uploaded photos or videos during a sporting event at 102 is more likely to do so again, than another mobile subscriber that has not uploaded media. Similarly, certain types of mobile devices, such as smartphones are more likely to transmit or receive large amounts of data than traditional flip phones without a data plan.

Figure 2:
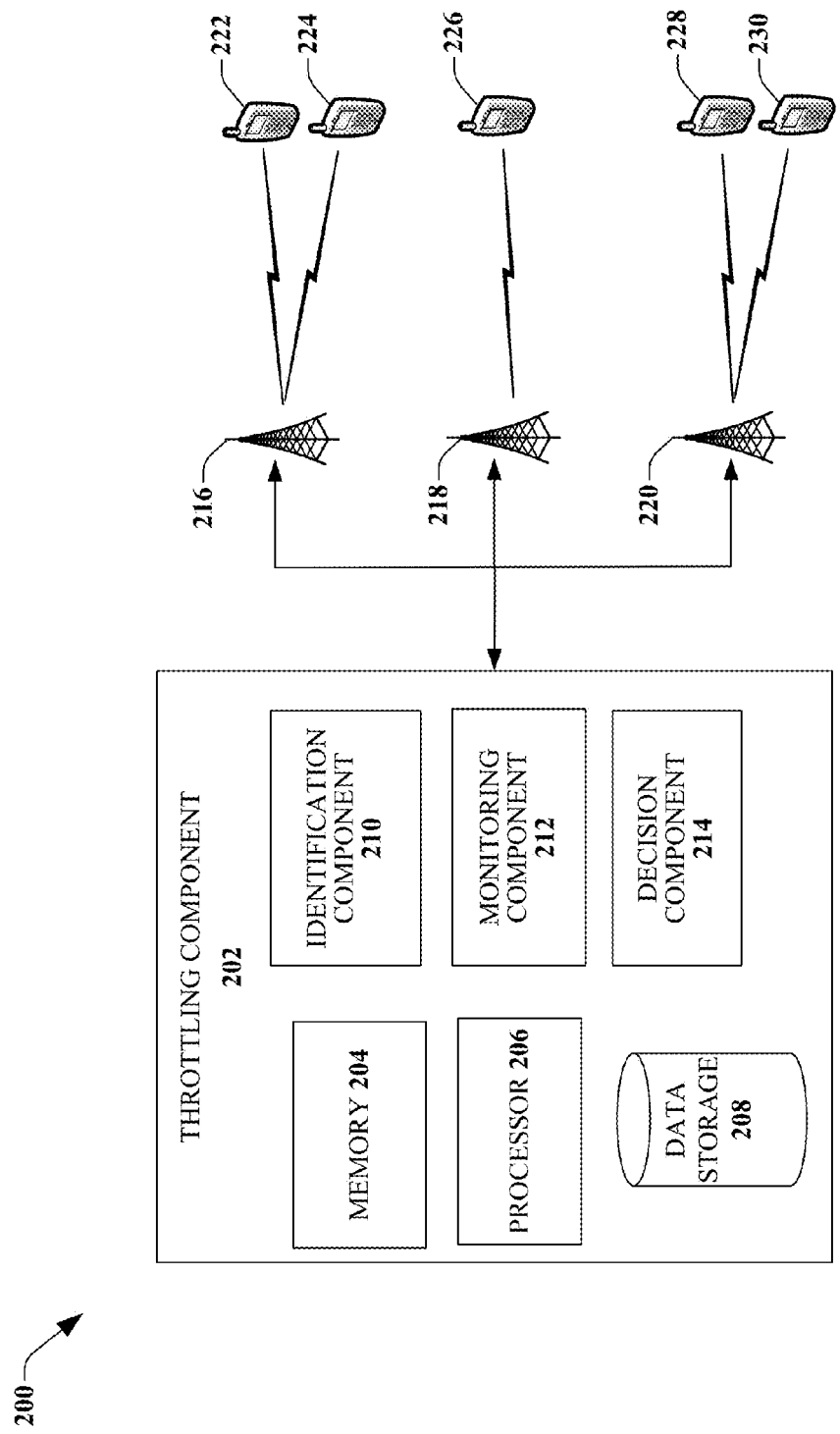
FIG. 2 is a block diagram illustrating an example, non-limiting embodiment of a system for mobile device data rate throttling in accordance with various aspects described herein.

Referring now to FIG. 2, a block diagram illustrating an example, non-limiting embodiment of a system 200 for mobile device data rate throttling in accordance with various aspects described herein is shown. System 200 includes a throttling component 202 that can throttle the data rate of mobile devices in order to minimize service disruptions at sporting events and other venues with large crowds of mobile device users. The throttling component 202 is communicably coupled, over a backhaul connection to the set of radio antennas 216, 218, and 220 at the venue (e.g., area 102). The radio antennas 216, 218, and 220 are also communicably coupled, via a cellular radio connection to mobile devices 222, 224, 226, 228, and 230.

The throttling component 202 can include a memory 204 that stores computer-executable instructions, and a processor 206 that facilitates execution of the of the computer executable instructions associated with one or more components. An identification component 210 can identify a set of mobile devices (e.g., 222-230) served by radio antennas 216, 218, and 220. The identification component 210 can identify the mobile devices 222-230 based on the IMSIs and TMSI transmitted by the mobile devices 222-230 to radio antennas 216, 218, and 220. The process of identification can include the technique described with regard to FIG. 1 above. Once identified, and a user profile showing past usage and predicted future usage has been generated, the user profile can be stored in data storage 208. A user profile for each of the mobile devices 222-230 and/or mobile subscribers can be stored until the mobile device has left the venue. In some embodiments, the data storage 208 can save the user profile for a particular mobile device for future use, especially when the user profile shows that the mobile device visits the venue frequently.

While the identification component 210 is identifying the mobile devices, monitoring component 212 can monitor the loading of the radio antennas 216, 218, and 220 to determine whether the loading is about to exceed a threshold level. The monitoring component 212 can also track the data rate of the mobile devices to identify the amount of strain or loading that each mobile device is putting on the radio antenna servicing the mobile device. The user profiles stored in data storage 208 can be updated with the radio resource consumption levels of each of the mobile devices in the venue, and can be used to identify mobile devices that are candidates for data throttling.

In some embodiments, the monitoring component 212 can also predict future loading based on past events as well as on current events. The monitoring component 212 can look at the radio antenna loading for previous events and use it to predict future loading. The monitoring component 212 can apply a weighting function so that similar events are weighted more heavily. For instance, if the location is an indoor arena, and the event is a basketball game, previous basketball games provide a more accurate example of the radio antenna loading at the current basketball game than do previous hockey games. Hockey has three periods with two breaks between the periods, whereas basketball has four quarters with breaks between the quarters. Since the breaks may experience greater mobile device usage, the exemplary loading of the radio antennas during previous basketball games is more likely to come to pass than the loading during the hockey game.

Monitoring component 212 can also use current events to predict radio antenna loading. For instance, at baseball games, a home run or other unpredictable happening may cause a spike in radio resource consumption. The monitoring component 212 can receive indications of when such events happen and use that information to predict whether the radio antenna loading will exceed a threshold.

The monitoring component 212 can also determine which of the radio antennas 216, 218, and 220 or more likely to experience significant strain. For instance, if radio antenna 216 is located near the entrance to the stadium, it may experience heavy loads at the beginning and endings of the event, but not during the event itself. In some embodiments monitoring component 212 can thus monitor radio antenna 216 at the beginning and ending of the event, and ignore it at other times. Similarly, if radio antenna 220 was located near the concession stands, monitoring component 212 can spend extra resources monitoring radio antenna 220 during regularly scheduled breaks in the event (e.g. between innings, quarters, periods, etc.).

Decision component 214 can determine whether to employ data rate throttling in order to keep the radio antenna loading below the threshold level. If the radio antenna loading overwhelms the radio antennas, disruptions in service can occur and even relatively low data rate activities such as texting and voice calling can be interrupted. Decision component 214 can be configured to activate data rate throttling before any disruptions occur, and can set the loading threshold at a sufficiently low point to ensure that data rate throttling is in place before the radio antennas are overloaded.

In some embodiments, decision component 214 can decide to throttle the data rate of one or more mobile devices based on predicted radio antenna loading surges. For instance, 10 minutes before the ending of an event, or just before scheduled breaks, decision component 214 can activate data rate throttling, even if the radio antenna loading is not yet at the threshold level.

Decision component 214 can also determine whether to throttle the data rates of all of the mobile devices equally, or just a portion of the mobile devices. Decision component 214 can base that decision on the user profile and the likelihood that each of the mobile devices is likely to consume a disproportionate amount of radio resources. Decision component 214 can also select the mobile devices to throttle the data rate of based on the location of the mobile device and the interference that it is causing (See explanation for FIGS. 3 and 4 for more details). For instance, a mobile device that is very close to a radio antenna may cause a large amount of interference (near-far problem), or a mobile device that is very far away, leading to path-loss of the transmission, or is behind an obstacle may require extra power from the radio antenna, thus limiting the power available to others. Accordingly, decision component 212 can determine that throttling the data rates of those mobile devices would lead to improved service for the remaining mobile devices, without having to employ additional throttling, or at least limited additional throttling.

Decision component 214 can also determine the type of data rate throttling to employ based on the circumstances. In some embodiments, the decision component 214 can determine to limit the data rates of all mobile devices equally. In other embodiments, decision component 214 can determine to limit the data rate of certain mobile devices, and not other. Some mobile devices can be limited more strictly, whereas others are limited only slightly.

Decision component 214 can make these determination based on a set of predefined guidelines. For instance, in one embodiment, decision component 214 can avoid noticeably degrading any subscriber's data rate to, and spread out the data rate throttling over all the mobile devices. In other embodiments, decision component 214 can have guidelines that prefer to limit data rate throttling to mobile devices that disproportionately stress the radio antennas. Decision component 214 can then strictly throttle the data rate of those selected mobile devices, while leaving others unthrottled. Decision component 214 can then decide on the data rate throttling technique to employ (See explanation for FIGS. 5 and 6 for more details).

Figure 3:
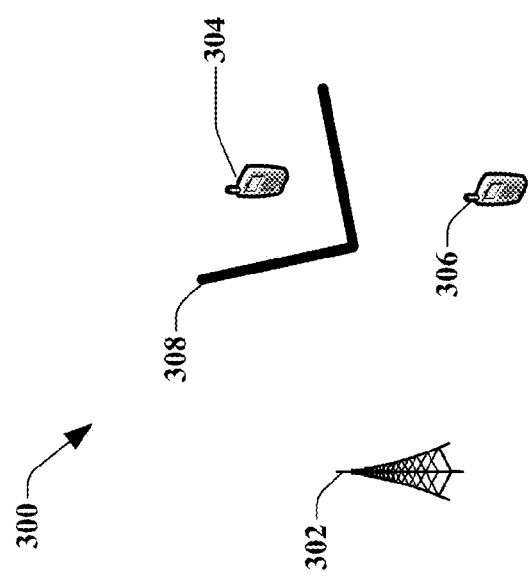
FIG. 3 is a block diagram illustrating an example, non-limiting embodiment of a system for determining the location and radio resource consumption of a mobile device in accordance with various aspects described herein.

Turning now to FIG. 3, a block diagram illustrating an example, non-limiting embodiment of a system 300 for determining the location and radio resource consumption of a mobile device in accordance with various aspects described herein is shown. System 300 includes a radio antenna 302 and mobile devices 304 and 306. Radio antenna 302 can measure timing delays to determine the distances of mobile devices 306 and 304 from the radio antenna 302.

In some embodiments, radio antenna 302 can also compare the distance to signal path loss ratio to determine whether or not obstacles (such as wall 308) are in the way between mobile device 304 and radio antenna 302. Mobile device 304 behind wall 308 and other obstacles can require a stronger signal from the radio antenna 302 and so can stress the radio antenna 302 more than mobile device 306 even though both mobile devices are similar distances to the radio antenna.

In other embodiments, the mobile network system can determine the location of mobile devices 304 and 306 from a network locating system that determines the location of mobile devices on the network using two or more radio antennas. In other embodiments, mobile devices 304 and/or 306 can report their locations to the mobile network system if the mobile devices have GPS capabilities. Since the position of the radio antenna 302 is known, the distance between the radio antenna 302 and the mobile devices 304 and 306 can be determined. The mobile network system can also have a layout and/or schematic of the location saved, and any obstructions between the radio antenna 302 and the mobile devices can be determined.

Figure 4:
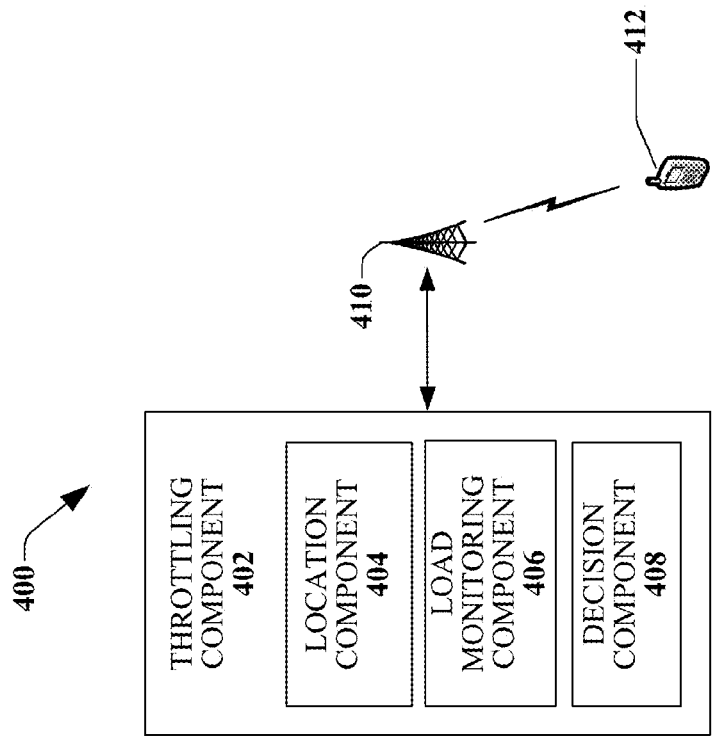
FIG. 4 is a block diagram illustrating an example, non-limiting embodiment of a system for determining the location and radio resource consumption of a mobile device in accordance with various aspects described herein.

FIG. 4 illustrates an example, non-limiting embodiment of a system 400 for determining the location and radio resource consumption of a mobile device in accordance with various aspects described herein. System 400 includes a throttling component 402 communicably coupled via a backhaul connection to a radio antenna 410 which communicates with a mobile device 412. The throttling component includes a location component 404, a load monitoring component 406 and a decision component 408.

Location component 404 can determine the location of the mobile device 412 using the techniques described above with regard to FIG. 3. Load monitoring component 406 can determine a load multiplier associated with mobile device 412. Mobile devices that are not too close and not too far from a radio antenna, and are not behind obstacles, will have an effective load multiplier of near one. As the distance between the mobile device 412 and the radio antenna 410 shrinks, the interference due to the near-far problem increases, thus increasing the load on the radio antenna 410. The load multiplier is larger therefore when the mobile device 412 is closer to the antenna since a greater load is placed on the radio antenna 410 for similar transmissions.

In other embodiments, as the distance increases, the radio antenna 410 requires greater power consumption to communicate effectively with mobile device 412 due to path loss effects. This increased consumption can cause increase the load of the radio antenna 410, thus increasing the load multiplier. If an obstruction (e.g., wall 308) is in place between radio antenna 410 and mobile device 412, greater power is needed to communicate with the mobile device 412, also placing greater load on the radio antenna 410.

Load monitoring component 406 can therefore determine a load multiplier for each of the mobile devices that which radio antenna 410 communicates. The load multiplier can change depending on where the mobile device 412 moves throughout the event. Load monitoring component 406 can thus keep the user profile stored in data storage 208 updated with the most recent load multiplier. Decision component 408 can determine which mobile devices to throttle based on the load multiplier effect. Throttling mobile devices with high load multipliers will provide a greater reduction in the load on the radio antennas than other mobile devices with lower load multipliers. Decision component 408 can therefore select mobile devices with high load multipliers preferentially when selecting mobile devices to throttle.

Figure 5:
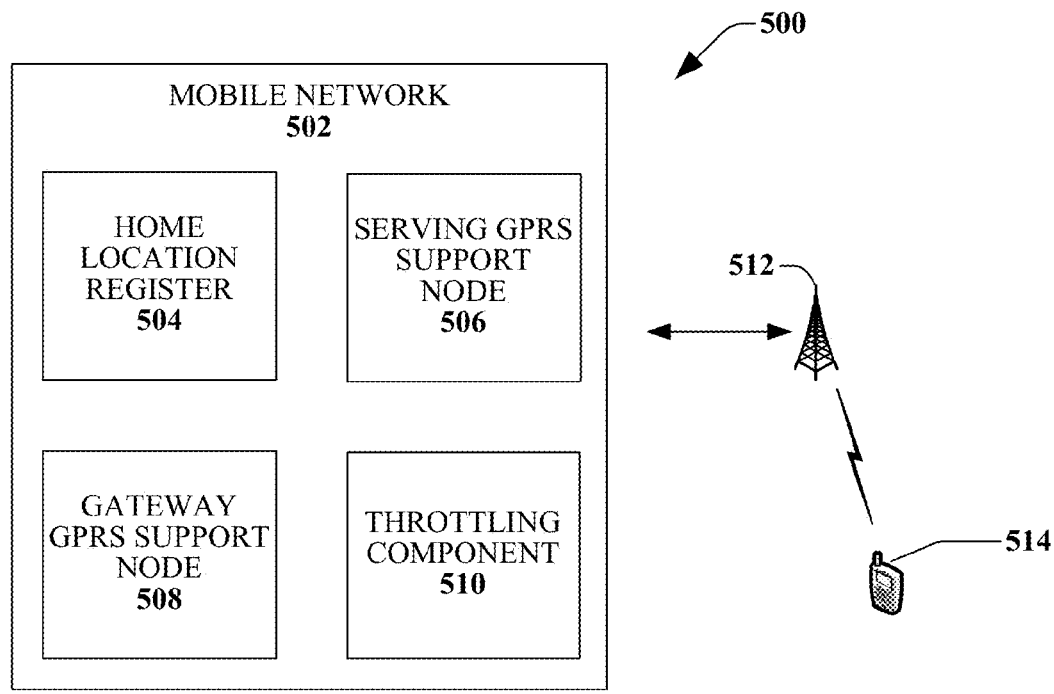
FIG. 5 is a block diagram illustrating an example, non-limiting embodiment of a system for data rate throttling in accordance with various aspects described herein.

Referring now to FIG. 5, a block diagram illustrating an example, non-limiting embodiment of a system 500 for data rate throttling in accordance with various aspects described herein is shown. System 500 includes a mobile network 502 that is communicably coupled to radio antenna 512 and mobile device 514. Elements of mobile network 502 can be a part of a core network, or can be localized at the venues, stadiums etc.

Mobile network 502 can include an HLR (Home Location Register) 504, a SGSN (Serving GPRS Support Node) 506, a GGSN (Gateway GPRS Support Node) 508, and a throttling component 510 (e.g., throttling components 202 and 402). In some embodiments, HLR 504 can be a VLR. Mobile network 502 can be used to facilitate the data rate throttling of mobile device 514 once a determination has been made by throttling component 510 (e.g., by decision components 214 and/or 408) about the type of data rate throttling to employ.

In an embodiment, throttle component 510 selects a set mobile devices, including mobile device 514, to throttle and notifies HLR 504 about which mobile devices have been selected, and by how much to throttle. The maximum allowable uplink and downlink data throughput for each mobile device can be set in the HLR 504. When SGSN 506 manages communications with mobile device 514, it can learn of the maximum data rate from the HLR 504 and then limits the radio resource allocation on the radio link establishment. In another embodiment, throttle component 510 can notify the GGSN 508 on a per mobile device basis about the maximum throughput is permitted, and GGSN effectively sets up a throttle per mobile device by limiting packet flow rate.

In some embodiments, mobile network 502 can throttle mobile device 514 by slowing maximum allowed uplink and downlink data rates. Mobile network 502 can also slow down the data throughput by manipulating how packets are handled. For instance, mobile network 502 can delay acknowledgement of receipt of packets by a small time.

Mobile network 502 can also selectively slow down data throughput on mobile device 514 on a per application basis. The throughput for certain applications can be lowered such that the data rate throttling is less noticeable. For instance, delivery of text messages and emails can be delayed or slowed without the subscriber realizing that data rate throttling is taking place. Similarly, uploading of pictures and/or video can also be slowed, while downlinks remain unaffected. In other embodiments, the mobile network 502 can also selectively throttle social media applications and other applications that use large amounts of bandwidth such as video streaming and uploading.

Figure 6:
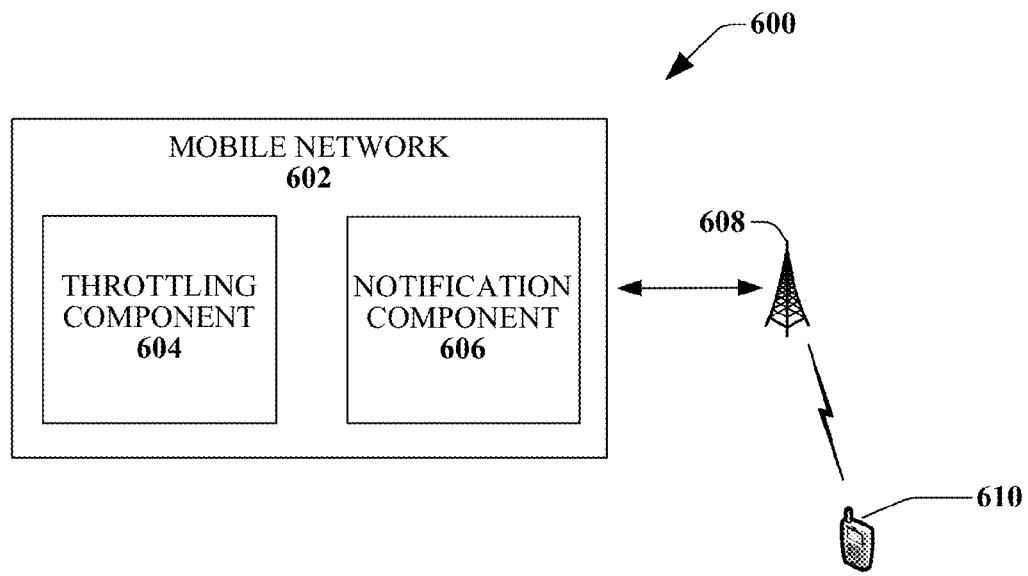
FIG. 6 is a block diagram illustrating an example, non-limiting embodiment of a system for data rate throttling in accordance with various aspects described herein.

Turning now to FIG. 6, a block diagram illustrating an example, non-limiting embodiment of a system 600 for data rate throttling in accordance with various aspects described herein is shown. System 600 includes mobile network 602 that is communicably coupled to radio antenna 608 and mobile device 610. Mobile network 602 includes a throttling component 604 as well as a notification component 606.

Mobile network 602 can be used to facilitate the data rate throttling of mobile device 608 once a determination has been made by throttling component 604 (e.g., by decision components 214 and/or 408) about which mobile devices to throttle.

In an embodiment, mobile device 610 can be selected to be throttled (among others in the set of mobile devices serviced by radio antenna 608) by throttling component 604. Instead of performing the data rate throttling in the mobile network 602, throttling component 604 can inform notification component 606 of the mobile devices that have been selected and the amount and type of data rate throttling. Notification component 606 can then notify mobile device 610, or an application on mobile device 610 about the data rate throttling to perform. Mobile device 610 can thus limit the uplink or downlink throughput to the maximum designated by the notification component 606. Such instructions can be sent via SMS, MMS, overhead broadcast channels, or as an API on a dedicated radio channel. Data rate throttling can then be released by notification component 606 in the same way when data rate throttling is no longer needed at the venue, or when mobile device 610 has left the venue.

Figure 7:
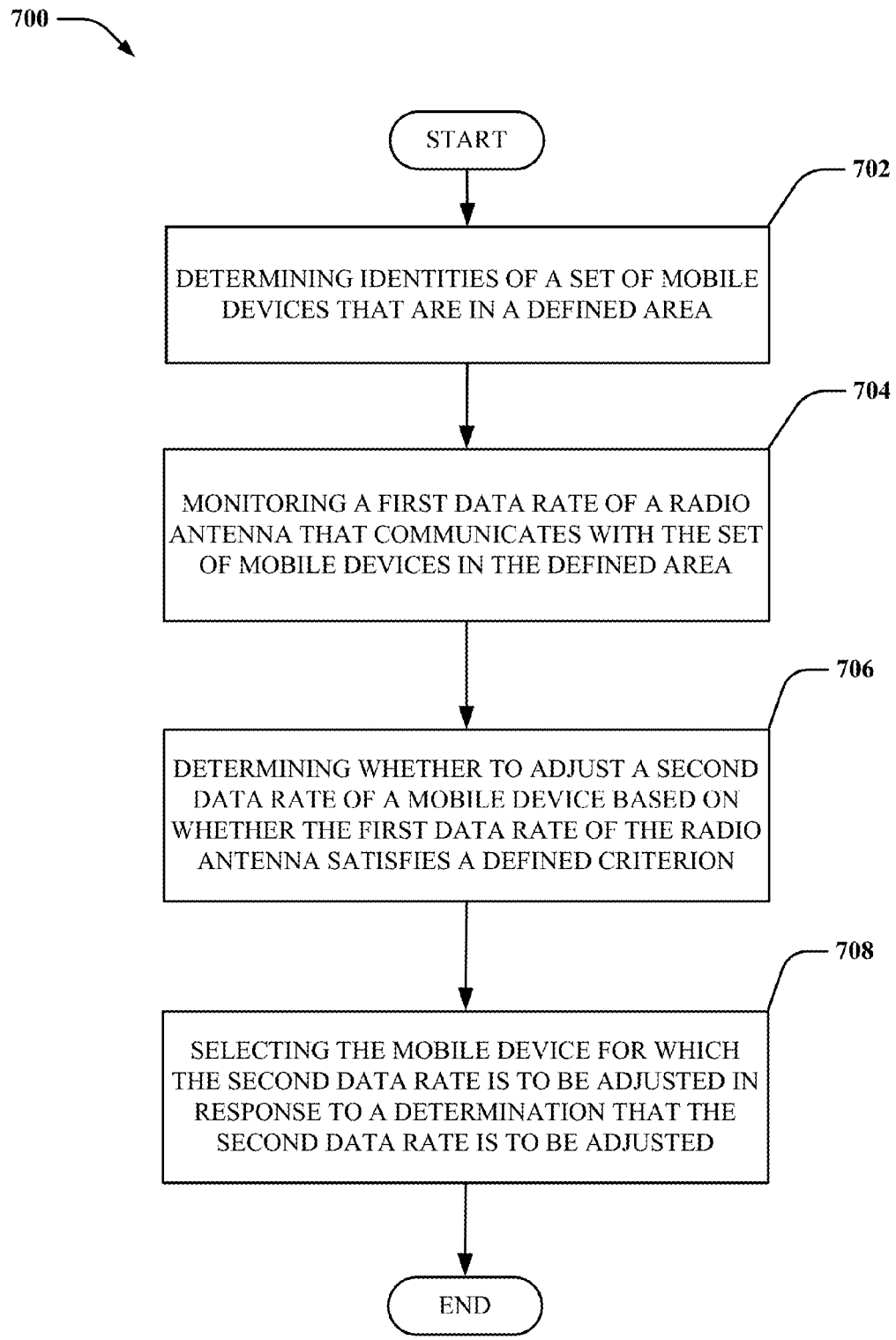
FIG. 7 illustrates a flow diagram of an example, non-limiting embodiment of a method for mobile device data rate throttling as described herein.
Figure 8:
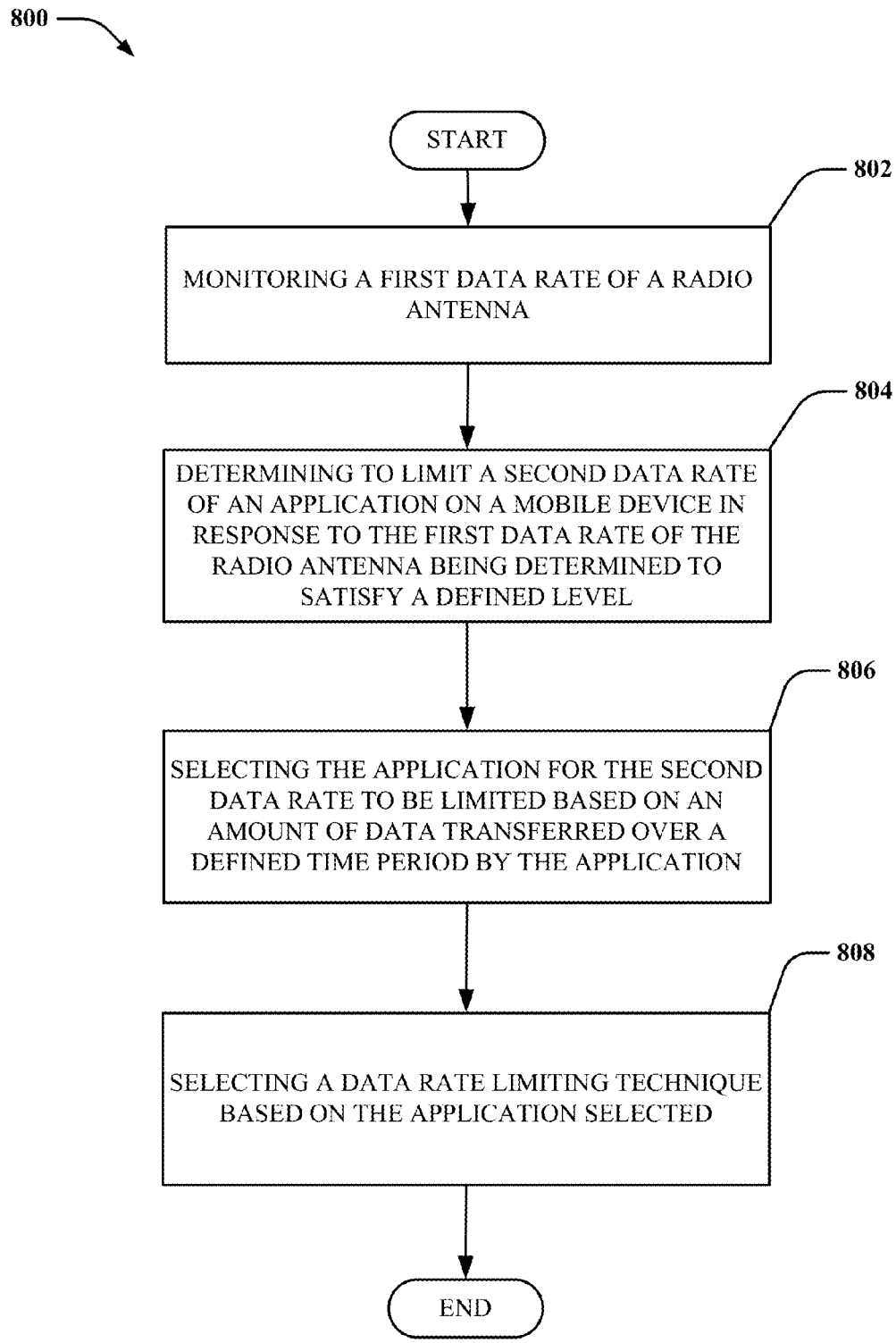
FIG. 8 illustrates a flow diagram of an example, non-limiting embodiment of a method for mobile device data rate throttling as described herein.

FIGS. 7 and 8 illustrates processes in connection with the aforementioned systems. The processes in FIGS. 7 and 8 can be implemented for example by systems 100, 200, 300, 400, 500, and 600 illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a method 700 for mobile device data rate throttling as described herein.

At 702, identities of a set of mobile device in a defined area are determined. The predetermined area can be a location such as a concert venue, a sports stadium, political rally, or any other area where large groups of people gather densely. In some embodiments, the predetermined area can include a permanent structure such as a stadium with many radio antennas that are designed to service mobile devices in that location. In other embodiments, the predetermined area can be temporary, and can include the area serviced by selected radio antennas.

The mobile network system can identify the mobile devices that are present in the predetermined area based on transmissions between the mobile devices. Control messages can be sent between the mobile device and the network via the radio antennas even when the mobile devices are not actively making phone calls or using the data services. The mobile network system can identify the mobile devices that enter the predetermined area based on identifiers transmitted in response to the control messages.

At 704, a first data rate of a radio antenna that communicates with the set of mobile devices in the defined area can be monitored. The mobile network system can determine whether the data rate, or loading, is about to exceed a threshold level based on a rate of increase in the loading. Future loading of the radio antenna can also be predicted based on past events and current events.

At 706, a determination can be made about whether to adjust a second data rate of a mobile device based on whether the first data rate of the radio antenna satisfies a defined criterion. The decision can be made to prevent service disruptions that may result if the loading exceeds the predetermined level. The predetermined level can be set low enough that data rate throttling is in place well before radio antennas are overloaded. A decision can also be made to throttle the data rate of one or more mobile devices based on the predicted loading of the radio antennas. Thus, before a scheduled break, or before the end of the event, data rate throttling can be employed, even if the radio antenna loading is not yet at the predetermined loading level yet.

At 708, a mobile device can be selected for which the second data rate is to be adjusted in response to a determination that the second data rate is to be adjusted. The decision can be based on the current data rate of the mobile device—mobile devices with high data rates can be throttled first, or more heavily than mobile devices with low data rates. The selection can also be made based on a user profile that indicates the likelihood of the mobile device consuming a large amount of bandwidth. A mobile device that has been identified as having a high data rate in the past at events, can be proactively throttled based on the predicted data rate.

In other embodiments, the mobile device can be selected based on the loading of the radio antenna that the mobile device is responsible for. Mobile devices that are very close to the radio antenna can cause increased interference and mobile devices that are far away, or behind obstacles and obstructions, might require additional power from the radio antenna to transmit a similar amount of data as another mobile device. Mobile devices that are stressing the radio antennas disproportionately can be selected for data rate throttling.

Turning now to FIG. 8, a flow diagram of an example, non-limiting embodiment of a method 800 for mobile device data rate throttling as described herein is shown.

At 802, a first data rate of a radio antenna can be monitored. The mobile network system can determine whether the data rate is about to exceed a threshold level based on a rate of increase in the bandwidth consumption. Future consumption of the radio antenna resources can also be predicted based on past events and current events.

At 804, a determination to limit a second data rate of an application on a mobile device can be made in response to the first data rate of the radio antenna being determined to satisfy a defined level. To limit the overall data rate of the mobile device, the throughput for certain applications can be lowered such that the data rate throttling is less noticeable. For instance, delivery of text messages and emails can be delayed and/or slowed without the subscriber realizing that data rate throttling is taking place. Similarly, uploading of pictures and/or video can also be throttled, while downlinks remain unaffected. At 806, the application can be selected based at least in part on a bandwidth usage, or amount of data transferred over a defined time period by the application. Accordingly, the mobile network can selectively throttle social media applications and other applications that use large amounts of bandwidth such as video streaming and uploading.

At 808, a data rate limiting technique can be selected based on the application selected to be throttled. Different techniques of throttling, such as lowering downlink and uplink speeds in the core network, or delaying packets, or controlling the maximum uplink and downlink speeds from the mobile device can be selected. Each of the different techniques may have advantages and disadvantages when throttling selected applications. For applications such as photo or video uploading, delaying packets, and thus latency may not have as much of an effect on reducing load as slowing the maximum allowed uplink data rate. Similarly, delaying packets can be particularly well suited to web browsing and/or video chatting, whereas reducing the maximum datalink throughputs may not be as effective. Accordingly, the mobile network system can select the best data rate throttling technique based on the application that is to be throttled.

Figure 9:
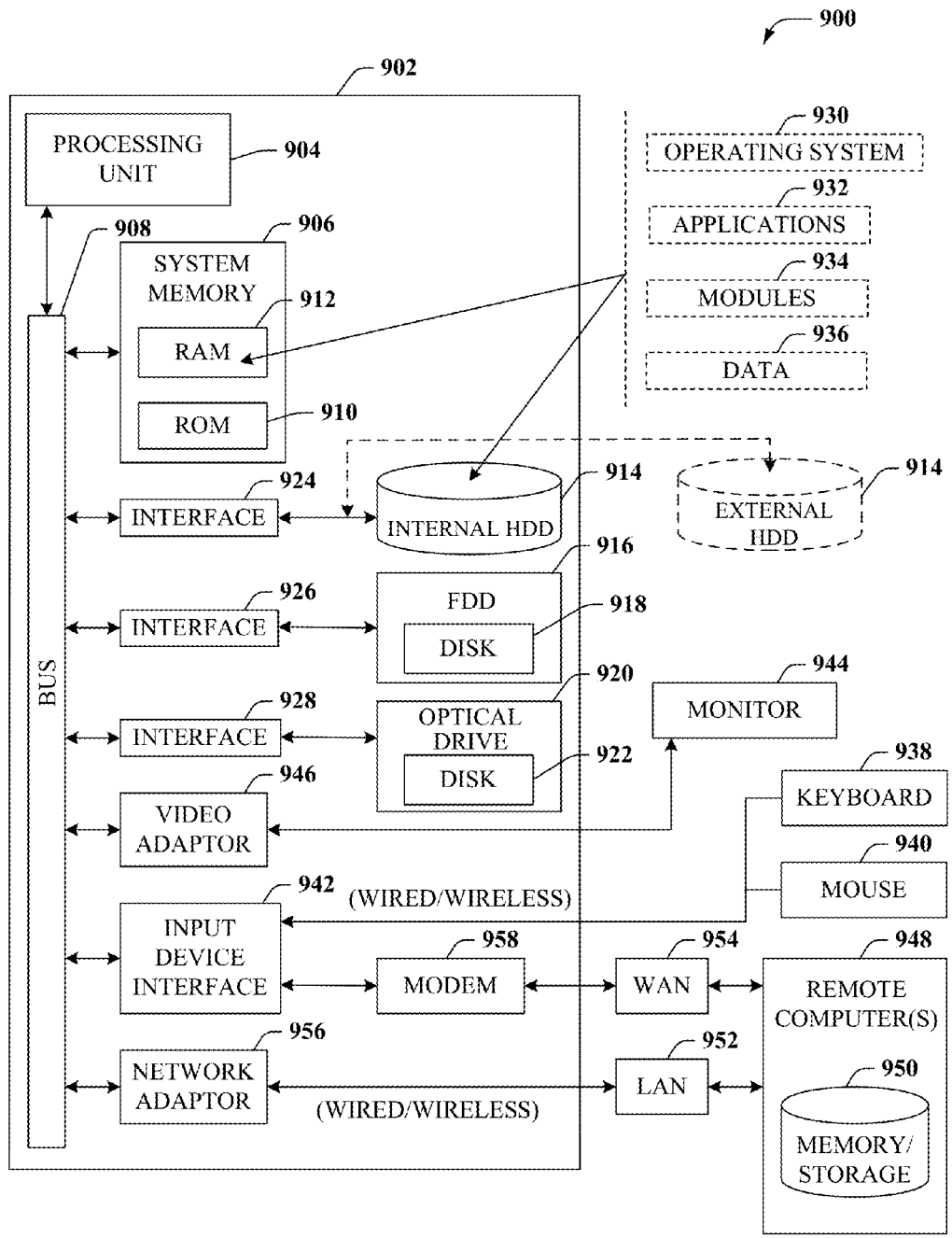
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the mobile device data rate throttling system 200, 400, 500 and/or 600.

In order to provide additional context for various embodiments of the embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
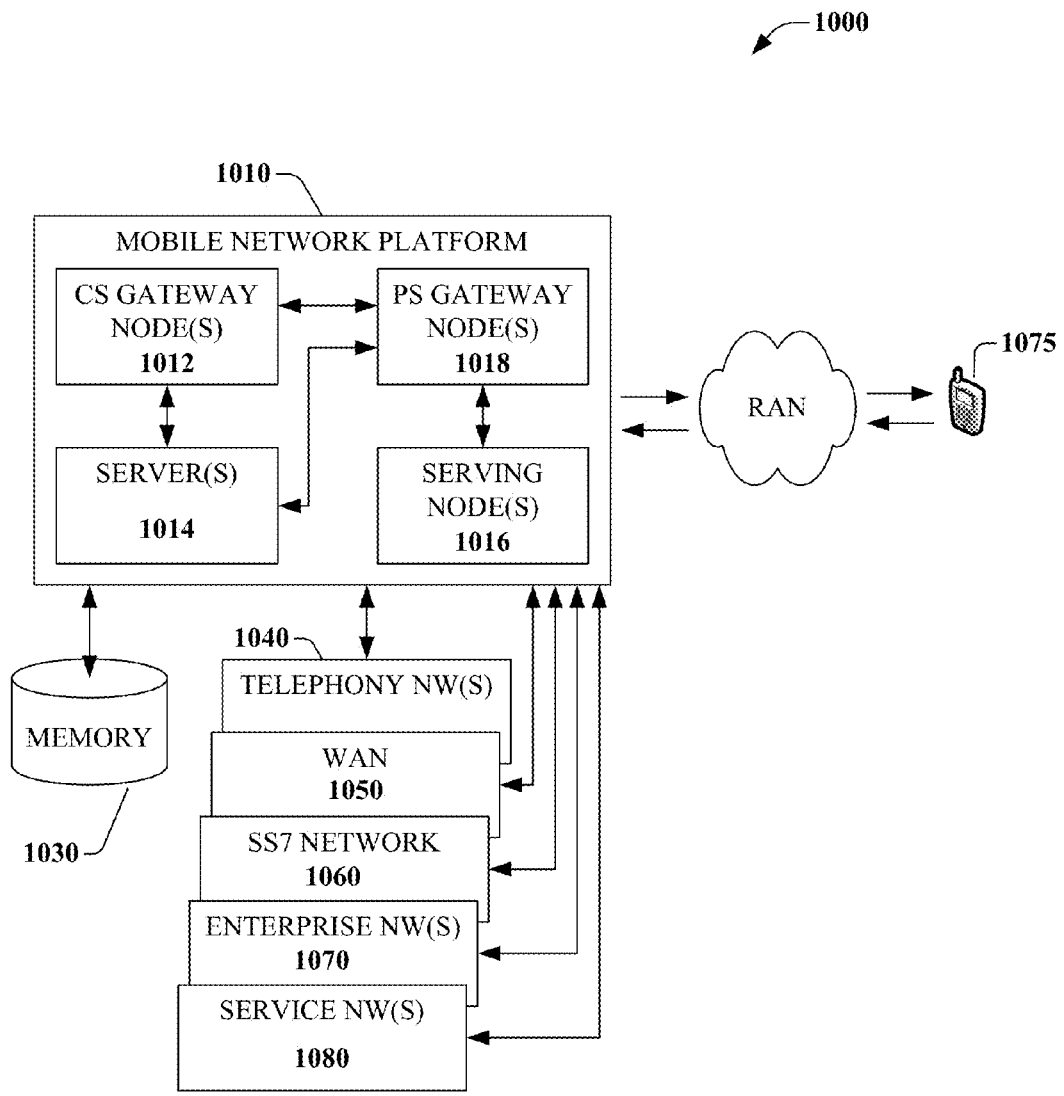
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs

1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, that facilitates execution of the executable instructions to perform operations, comprising:
      identifying a set of mobile devices served by a set of radio antennas;
      based on a predicted loading of the radio antenna being determined to have exceeded a defined threshold, determining that a loading of a radio antenna of the set of radio antennas is to be reduced to maintain a data rate level, wherein the loading is a function of a utilized antenna resource based on a first data rate and an interference associated with the radio antenna, and wherein the data rate level is based on a function of a defined level;
      determining a respective proportion of the predicted loading of the radio antenna to which each mobile device of the set of mobile devices contributes;
      selecting a mobile device from the set of mobile devices to be subjected to data rate reduction, wherein the mobile device is selected based on the respective proportion of the predicted loading of the radio antenna that is associated with the mobile device; and
      instructing that a second data rate of the mobile device is to be reduced.

2. The system of claim 1, wherein the operations further comprise storing usage data representing usage histories for the set of mobile devices, wherein the usage data comprises first information relating to bandwidth usage by the set of mobile devices and second information relating to application usage by the set of mobile devices.

3. The system of claim 2, wherein the selecting comprises selecting the mobile device based on a usage history of the mobile device identified in the usage data.

4. The system of claim 1, wherein the operations further comprise determining the mobile device has contributed to the loading based on bandwidth usage data of the mobile device representing information about bandwidth used by the mobile device, distance data representing a distance of the mobile device from the radio antenna and interference data representing an amount of interference between the mobile device and the radio antenna.

5. The system of claim 1, wherein the operations further comprise:
   determining a location of the mobile device; and
   determining a load multiplier of the mobile device based on distance data representing a distance of the mobile device from the radio antenna and map data representing a map of structural obstacles between the mobile device and the radio antenna.

6. The system of claim 1, wherein the operations further comprise:
   determining the predicted loading of the radio antenna as a function of historical data rate information of the radio antenna and current event information associated with the radio antenna.

7. The system of claim 1, wherein the instructing the second data rate of the mobile device to be reduced comprises instructing the mobile device that the second data rate of the mobile device is to be reduced to a predetermined level.

8. The system of claim 1, wherein the instructing the second data rate of the mobile device to be reduced comprises instructing the mobile device that a third data rate of an application on the mobile device is to be reduced to a predetermined level.

9. The system of claim 1, wherein the instructing the second data rate of the mobile device to be reduced comprises instructing that an acknowledgement of a reception of a packet from the mobile device is to be delayed.

10. A method, comprising: determining, by a device including a processor, identities of a set of mobile devices that are in a defined area; predicting, by the device, a future resource usage of a radio antenna that communicates with the set of mobile devices in the defined area based on a past data rate of the radio antenna and on a schedule of events in the defined area, wherein the future resource usage of the radio antennas is a function of a predicted data rate and interference associated with the radio antenna; determining, by the device, whether to adjust a first data rate of a mobile device based on whether the predicted data rate of the radio antenna satisfies a defined criterion and a respective proportion of the future resource usage of the radio antenna to which each mobile device of the set of mobile devices contributes; and
   selecting, by the device, the mobile device for which the first data rate is to be adjusted based on a percentage of the future resource usage associated with the mobile device, wherein the selecting is in response to a determination that the first data rate is to be adjusted.

11. The method of claim 10, further comprising receiving, by the device, information about data rate levels for the set of mobile devices.

12. The method of claim 11, wherein the selecting the mobile device comprises selecting the mobile device based on comparing the data rate levels of the set of mobile devices.

13. The method of claim 11, wherein the receiving the information comprises determining the data rate levels based on respective amounts of data transferred by the set of mobile devices per unit of time, respective distances of the set of mobile devices from the radio antenna or respective interferences measured between the set of mobile devices and the radio antenna.

14. The method of claim 13, further comprising determining, by the device, the respective distances of the set of mobile devices from the radio antenna and the respective interferences based on an analysis of respective locations of the set of mobile devices, a location of the radio antenna, or map data representative of locations of structural obstacles between the set of mobile devices and the radio antenna.

15. The method of claim 10,
wherein the determining whether to adjust the second data rate comprises determining whether to limit the first data rate of the mobile device in response to the predicted data rate of the radio antenna being determined to satisfy the defined criterion.

16. The method of claim 10, wherein the determination that the first data rate of the mobile device is to be adjusted comprises a determination that an acknowledgement of a reception of a packet from the mobile device is being delayed.

17. A computer readable storage device, comprising computer-executable instructions that, in response to execution, cause a device including a processor to perform operations, comprising:

determining a future utilized resource level of a radio antenna based on a past data rate of the radio antenna and on current event information associated with the defined area, wherein the future utilized resource level is a function of a predicted data rate and interference associated with the radio antenna;

determining to restrict a data rate of an application on a mobile device in response to the predicted data rate of the radio antenna being determined to satisfy a defined level and a respective proportion of the future utilized resource level of the radio antenna to which each mobile device of the set of mobile devices contributes, wherein the mobile device is selected based on a predicted contribution to the future utilized resource level of the radio antenna by the mobile device; and instructing the mobile device to restrict the data rate of the application based on an amount of data transferred over a defined time period by the application.

18. The computer readable storage device of claim 17, wherein the operations further comprise:
selecting the application based on a priority level determined for the application.

19. The computer readable storage device of claim 17, wherein the operations further comprise:
selecting a procedure for data rate limiting to be used to reduce the data rate based on a type of the application.

20. The computer readable storage device of claim 17, wherein the operations further comprise:
selecting the mobile device based on comparing the data rate levels of the set of mobile devices.

* * * * *